US011651769B2

(12) United States Patent
Choi

(10) Patent No.: US 11,651,769 B2
(45) Date of Patent: May 16, 2023

(54) ELECTRONIC DEVICE AND OPERATING METHOD THEREOF

(71) Applicant: Samsung Electronics Co., Ltd., Suwon-si (KR)

(72) Inventor: Chanhee Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 214 days.

(21) Appl. No.: 17/018,234

(22) Filed: Sep. 11, 2020

(65) Prior Publication Data

US 2021/0074290 A1 Mar. 11, 2021

(30) Foreign Application Priority Data

Sep. 11, 2019 (KR) ........................ 10-2019-0113010

(51) Int. Cl.
*G10L 15/22* (2006.01)
*G10L 25/78* (2013.01)

(52) U.S. Cl.
CPC .............. *G10L 15/22* (2013.01); *G10L 25/78* (2013.01); *G10L 2015/223* (2013.01)

(58) Field of Classification Search
CPC ... G10L 15/22; G10L 2015/223; G10L 25/78; G10L 2025/786; G10L 2015/228; G10L 15/02; G10L 15/05; G10L 15/30
See application file for complete search history.

(56) References Cited

U.S. PATENT DOCUMENTS 5,657,422 A 8/1997 Janiszewski et al.
6,577,701 B2 * 6/2003 Ukita .................... G06T 3/4007 378/19
9,818,407 B1 * 11/2017 Seeker-Walker ....... G10L 25/78
9,940,949 B1 * 4/2018 Vitaladevuni ........... G10L 25/78
10,056,096 B2 5/2018 Yoo
11,133,008 B2 * 9/2021 Piernot ................. H04W 4/025
11,212,612 B2 * 12/2021 Lang ....................... G10L 15/22
(Continued)

FOREIGN PATENT DOCUMENTS

JP 4666129 4/2011
JP 6335139 B2 5/2018
(Continued)

OTHER PUBLICATIONS

International Search Report and Written Opinion of the International Searching Authority dated Nov. 25, 2020 in International Patent Application No. PCT/KR2020/011498.
(Continued)

*Primary Examiner* — Vijay B Chawan
(74) *Attorney, Agent, or Firm* — Staas & Halsey LLP

(57) ABSTRACT

An electronic device includes a memory storing one or more instructions; and a processor configured to execute the one or more instructions stored in the memory to receive audio data corresponding to a user's utterance, to identify the user's utterance characteristics based on the received audio data, to determine a parameter for performing voice activity detection, by using the identified user's utterance characteristics, and to perform voice activity detection on the received audio data with respect to the user's utterance by using the determined parameter.

13 Claims, 8 Drawing Sheets

(56) References Cited

U.S. PATENT DOCUMENTS

| | | | | |
|---|---|---|---|---|
| 2012/0130713 | A1* | 5/2012 | Shin | G10L 25/78 704/E15.001 |
| 2015/0255090 | A1* | 9/2015 | Kim | G10L 25/84 704/233 |
| 2015/0348548 | A1* | 12/2015 | Piernot | G10L 15/26 704/235 |
| 2016/0180851 | A1* | 6/2016 | Bringert | G10L 17/22 704/251 |
| 2018/0068677 | A1* | 3/2018 | Suzuki | G10L 25/78 |
| 2018/0268808 | A1* | 9/2018 | Song | G10L 15/063 |
| 2018/0336905 | A1* | 11/2018 | Kim | G10L 17/22 |
| 2019/0051288 | A1* | 2/2019 | Lee | G10L 15/30 |
| 2019/0172467 | A1* | 6/2019 | Kim | G10L 15/16 |
| 2019/0198012 | A1* | 6/2019 | Zhang | G10L 15/05 |
| 2019/0259407 | A1* | 8/2019 | Sehlstedt | G10L 25/78 |
| 2020/0103963 | A1* | 4/2020 | Kelly | G10L 15/22 |
| 2020/0349935 | A1* | 11/2020 | Smith | G10L 15/08 |

FOREIGN PATENT DOCUMENTS

| | | |
|---|---|---|
| KR | 10-2015-0105847 | 9/2015 |
| KR | 10-1699252 | 1/2017 |
| KR | 10-2017-0035625 | 3/2017 |
| KR | 10-2019-0018282 | 2/2019 |
| KR | 10-2080002 B1 | 2/2020 |

OTHER PUBLICATIONS

Extended European Search Report dated Nov. 16, 2020 in European Patent Application No. 20195342.9.

European Notice of Allowance dated Dec. 20, 2022 in European Patent Application No. 20 195 342.9 (44 pages).

* cited by examiner

ERROR IN DETERMINATION OF HANGOVER TIME

ERROR IN DETERMINATION OF AUTOMATIC END TIME

800

| USER IDENTIFICATION INFORMATION | USER FACE INFORMATION | USER FINGERPRINT INFORMATION | VAD PARAMETER | TRIGGER WORD UTTERANCE ENERGY LEVEL | TRIGGER WORD UTTERANCE RATE |
|---|---|---|---|---|---|
| ID1 | F1 | FP1 | Eth1, T1 | E1 | V1 |
| ID2 | F2 | FP2 | Eth2, T2 | E2 | V2 |
| ID3 | F3 | FP3 | Eth3, T3 | E3 | V3 |
| ID4 | F4 | FP4 | Eth4, T4 | E4 | V4 |

ELECTRONIC DEVICE AND OPERATING METHOD THEREOF

CROSS-REFERENCE TO RELATED APPLICATIONS

This application is based on and claims priority under 35 U.S.C. § 119 to Korean Patent Application No. 10-2019-0113010, filed on Sep. 11, 2019, in the Korean Intellectual Property Office, the disclosure of which is incorporated by reference herein in its entirety.

BACKGROUND

1. Field

Various embodiments of the disclosure relate to an electronic device and an operating method thereof, and more particularly, to an electronic device for detecting voice activity detection with respect to a user's utterance and an operating method thereof.

2. Description of the Related Art

Voice recognition refers to a process of converting an audio signal obtained through a sound sensor such as a microphone into text data such as words or a sentence. As the numbers of devices and services for providing voice recognition are increasing, voice recognition has been used in various forms in various places.

A voice recognition system performs voice activity detection (VAD) to distinguish between an utterance section and a non-utterance section in an audio signal before performing voice recognition. For example, because it is not necessary to perform voice recognition with respect to a non-utterance section of the audio signal in which a user did not utter, voice recognition is performed only with respect to an utterance section detected through VAD.

The voice recognition system performs VAD by applying an average parameter value obtained as a result of analyzing people's utterances in general. In this case, a VAD error occurs in the case of a user with a relatively low or high utterance rate.

SUMMARY

Various embodiments of the disclosure provide an electronic device capable of changing a parameter for performing voice activity detection according to a user's utterance characteristics and an operating method thereof.

Additional aspects will be set forth in part in the description which follows and, in part, will be apparent from the description, or may be learned by practice of the presented embodiments of the disclosure.

According to an embodiment of the disclosure, an electronic device includes a memory storing one or more instructions; and a processor configured to execute the one or more instructions stored in the memory receive audio data corresponding to a user's utterance, to identify the user's utterance characteristics based on the received audio data, to determine a parameter for performing voice activity detection by using the identified user's utterance characteristics, and to perform voice activity detection one the received audio data with respect to the user's utterance by using the determined parameter.

In one embodiment of the disclosure, the audio data may include an utterance section corresponding to a trigger word uttered by the user.

In one embodiment of the disclosure, the determining of a parameter comprises comparing the user's utterance characteristics with reference utterance characteristics with respect to the trigger word, and changing the parameter based on a result of the comparing of.

In one embodiment of the disclosure, the identifying of the user's utterance characteristics comprises identifying the user's utterance characteristics based on the received audio data when the audio data includes an utterance section corresponding to the trigger word.

In one embodiment of the disclosure, the performing of voice activity detection may include detecting a start point of the user's utterance on the received audio data and an end point of the user's utterance on the received audio data while the user is uttering to distinguish between an utterance section of the receive audio data and a non-utterance section of the received audio data.

In one embodiment of the disclosure, the identified user's utterance characteristics may include at least one of the user's utterance rate, utterance energy level or pitch of uttered sound.

In one embodiment of the disclosure, the parameter for performing voice activity detection may include one or more of an energy threshold for identifying, on the received audio data, an utterance section, a hangover time, or automatic end time while the user is uttering.

In one embodiment of the disclosure, the electronic device may further include a communicator configured to receive the audio data corresponding to the user's utterance.

In one embodiment of the disclosure, the electronic device may further include a microphone configured to receives the user's utterance and to convert the user's utterance into the audio data.

According to another embodiment of the disclosure, an operating method of an electronic device includes receiving audio data corresponding to a user's utterance; identifying the user's utterance characteristics based on the received audio data; determining a parameter for performing voice activity detection, by using the identified user's utterance characteristics; and performing voice activity detection on the received audio data with respect to the user's utterance by using the determined parameter.

The identifying of the user's utterance characteristics comprises identifying the user's utterance characteristics based on the received audio data when the audio data includes an utterance section corresponding to a trigger word uttered by the user.

The determining of the parameter for performing voice activity detection comprises comparing the identified user's utterance characteristics with reference utterance characteristics with respect to the trigger word.

The identifying of the user's utterance characteristics comprises identifying the user's utterance characteristics based on the audio data when the audio data comprises the utterance section corresponding to the trigger word.

The performing of voice activity detection comprises detecting a start point of the user's utterance and an end point of the user's utterance while the user is uttering to distinguish between an utterance section of the received audio data and a non-utterance section of the received audio data.

The determining of the parameter comprises determining the parameter for performing voice activity detection based on at least one of the user's utterance rate, utterance energy level, or pitch of uttered sound.

The parameter for performing voice activity detection comprises at least one of an energy threshold for identifying an utterance section, a hangover time, or an automatic end time while the user is uttering.

The receiving of the audio data of the user's utterance comprises receiving the audio data corresponding to the user's utterance through a communicator.

The receiving of the audio data of the user's utterance comprises receiving the user's utterance through a microphone and converting the user's utterance into the audio data.

A non-transitory computer-readable recording media having recorded thereon a program for executing in a computer the operating method of claim 10.

The processor is further configured to execute to perform the voice activity detection based on the changed user's utterance characteristics. The performing of voice activity detection further comprises performing the voice activity detection based on the changed user's utterance characteristics.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
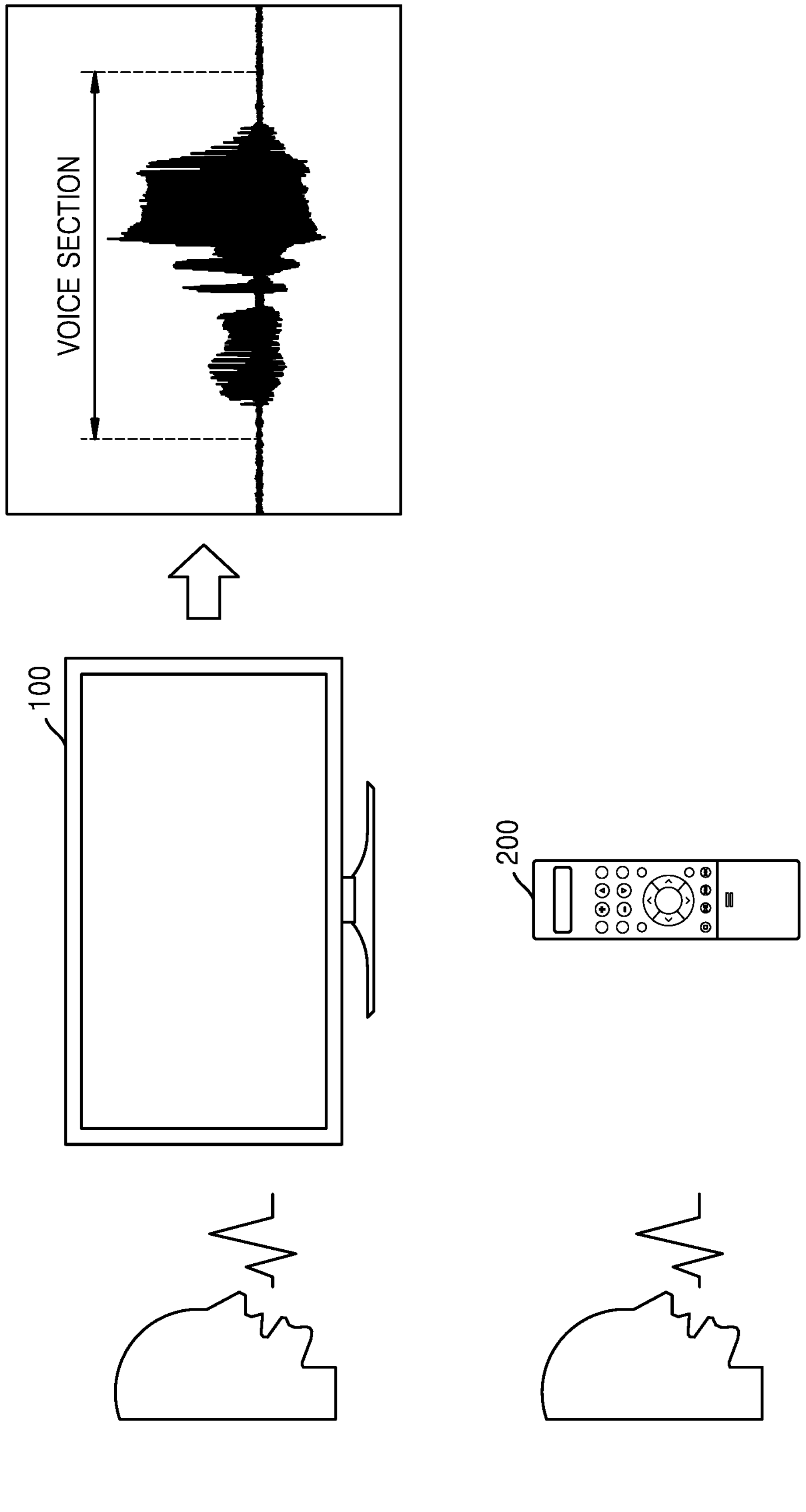
FIG. 1 is a diagram illustrating an electronic device according to an embodiment of the disclosure.

The terms used in the present specification will be briefly described and then the disclosure will be described in detail.

In the disclosure, general terms that have been widely used nowadays are selected, when possible, in consideration of functions of the disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure.

It will be understood that when an element is referred to as "including" another element, the element may further include other elements unless mentioned otherwise. Terms such as "unit", "module," and the like, when used herein, represent units for processing at least one function or operation, which may be implemented by hardware, software, or a combination of hardware and software.

In embodiments of the disclosure, the term "user" refers to a viewer watching an image displayed on an electronic device or a person controlling a function or operation of the electronic device and may include an administrator or an installation engineer.

Hereinafter, embodiments of the disclosure will be described in detail with reference to the accompanying drawings, so that the embodiments of the disclosure may be easily implemented by those of ordinary skill in the art. However, the disclosure may be embodied in many different forms and is not limited to the embodiments of the disclosure set forth herein. For clarity, parts not related to explaining the disclosure are omitted in the drawings, and like components are denoted by like reference numerals throughout the specification.

FIG. 1 is a diagram illustrating an electronic device according to an embodiment of the disclosure.

Referring to FIG. 1, an electronic device 100 according to an embodiment of the disclosure may be embodied as various types of electronic devices, such as a TV, a set-top box, a mobile phone, a speaker, a tablet PC, a digital camera, a camcorder, a laptop computer, a desktop computer, an e-book terminal, a digital broadcasting terminal, a personal digital assistant (PDA), a portable multimedia player (PMP), a navigation device, an MP3 player, an Internet protocol television (IPTV), a digital Television (DTV), a wearable device, and the like. Alternatively, the electronic device 100 according to the embodiment of the disclosure may be a household appliance such as a refrigerator, a washing machine, an air conditioner, a vacuum, a light bulb, or an air purifier. Alternatively, the electronic device 100 may be a fixed electronic device provided at a fixed position or a mobile electronic device having a portable form or may be a digital broadcast receiver capable of receiving digital broadcasting services.

In one embodiment of the disclosure, a control device 200 may be embodied as various types of devices, such as a remote control or a cellular phone, for control of the electronic device 100. An application for controlling the electronic device 100 may be installed in the control device 200, and the control device 200 may control the electronic device 100 by using the installed application. However, embodiments of the disclosure are not limited thereto. In addition, the control device 200 may control the electronic device 100 by using Infrared (IR), Bluetooth (BT), W-Fi, or the like.

A user may speak or utter to the electronic device 100. The user's utterance may include natural language instructing the electronic device 100 to perform a certain function (e.g., to control operations of hardware/software components included in the electronic device 100, content search, etc.).

In one embodiment of the disclosure, the electronic device 100 may convert a user's utterance into an audio signal (audio data), which is an electrical signal, using an internal or external audio input module (e.g., a microphone).

A user may utter to the control device 200, and the control device 200 may convert the user's utterance into an audio signal (audio data), which is an electrical signal, using an internal or external microphone. The control device 200 may transmit the audio signal to the electronic device 100, and the electronic device 100 may receive the audio signal corresponding to the user's utterance from the control device 200 through a communication module.

In one embodiment of the disclosure, when a trigger word (or a wakeup word) is identified or a predetermined input is received, the electronic device 100 may start voice recognition with respect to the audio signal. The predetermined input may be an input for pressing a physical button included in the electronic device 100 or an input for selecting a graphic interface (e.g., an icon or the like) displayed on the electronic device 100 or a display of the electronic device 100. Alternatively, the predetermined input may be an input for selecting a physical button included in the control device 200 communicating with the electronic device 100 or an input for selecting a graphic interface displayed on a display of an external device.

When voice recognition is started for the audio signal, the electronic device 100 according to an embodiment of the disclosure may perform voice activity detection by analyzing the audio signal of the user's utterance. Voice activity detection refers to a process of distinguishing between a voice section and a silent section from an audio signal of a user's utterance by detecting the start and end of the utterance while the user is uttering.

Accordingly, the audio signal or audio data corresponding to the silent section is not processed to minimize use of resources by the electronic device 100. Alternatively, when voice recognition is performed with respect to the audio signal or the audio data by an external server or an external device, the audio signal or audio data corresponding to the silent section may not be transmitted to the external server or external device so as to reduce network traffic.

In one embodiment of the disclosure, the electronic device 100 may divide audio data of a user's utterance into a plurality of frames and identify whether each of the plurality of frames is a voice section or a non-voice section. For example, the electronic device 100 may identify whether each of the plurality of frames is a voice section or a non-voice section, based on an utterance energy threshold, a hangover time, an automatic end time, etc. The electronic device 100 may identify that a frame corresponds to a voice section when an utterance energy level corresponding to the frame is greater than or equal to a threshold, and identify that the frame corresponds to a non-voice section when the utterance energy level corresponding to the frame is less than the threshold. Alternatively, the electronic device 100 may determine that the utterance has ended when the non-utterance section continues for the hangover time or longer. When an utterance end point is not detected, the electronic device 100 may determine that the utterance has ended when an automatic end time has elapsed. However, embodiments of the disclosure are not limited thereto.

Figure 2A:
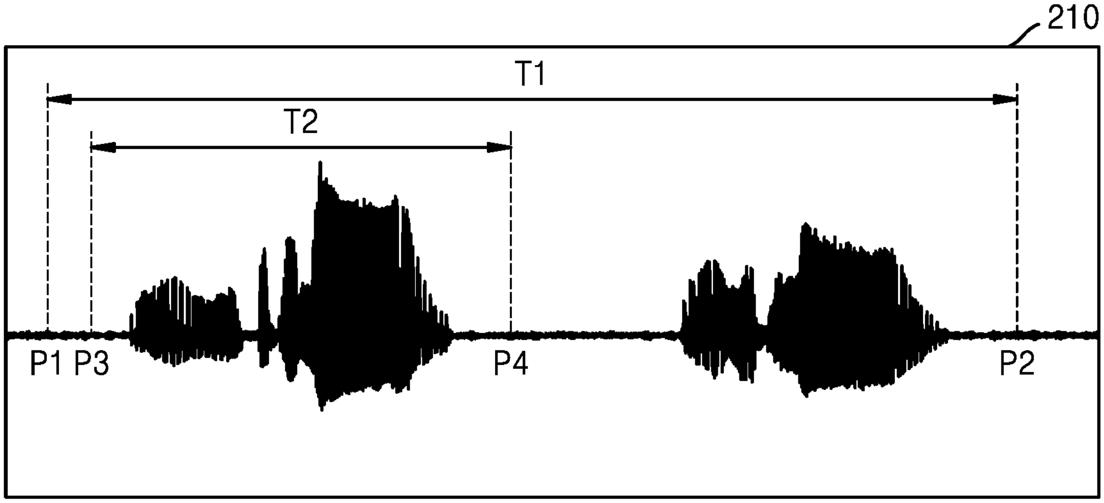
FIG. 2A is a diagram for describing an example in which an error occurs when voice activity detection is performed with respect to audio data of a user's utterance.
Figure 2B:
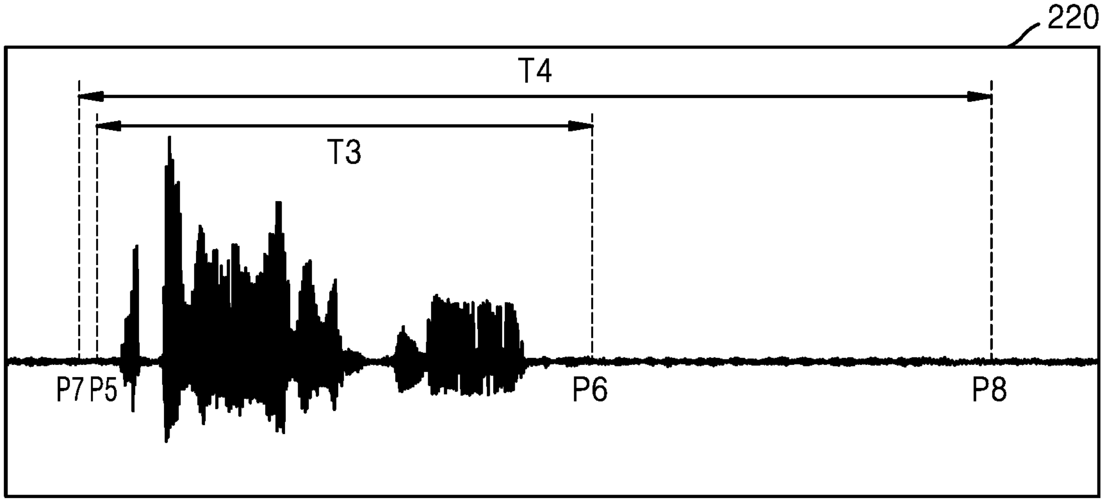
FIG. 2B is a diagram for describing another example in which an error occurs when voice activity detection is performed with respect to audio data of a user's utterance.

FIG. 2A is a diagram for describing an example in which an error occurs when voice activity detection is performed with respect to audio data of a user's utterance, and FIG. 2B is a diagram for describing another example in which an error occurs when voice activity detection is performed with respect to audio data of a user's utterance.

FIG. 2A illustrates audio data 210 when a user having a relatively slow utterance rate utters.

When a set hangover time has elapsed, a voice activity detector determines that an utterance has ended. When the user's utterance rate is low, a time period between one word and another word (a time period until a subsequent word is spoken after a word is spoken) becomes longer than the set hangover time and thus it may be determined that an utterance has ended although the utterance does not end. For example, as illustrated in FIG. 2A, the user's actual utterance start point is P1, an actual utterance end point is P2, and an actual voice section (utterance section) is T1, but the voice activity detector may determine that the user's utterance start point is P3, an utterance end point is P4, and the user's voice section (utterance section) is T2. Accordingly, the user's utterance may be lost.

Alternatively, when a set automatic end time has elapsed, the voice activity detector determines that the utterance has ended. When the user's utterance rate is high, it may be determined that the utterance has ended after a long time even though the utterance has already been ended. For example, as illustrated in FIG. 2B, the user's actual utterance start point is P5, an actual utterance end point is P6, and an actual voice section (utterance section) is T3, but the voice activity detector may determine that the user's utterance start point is P7, an utterance end point is P8, and the user's voice section (utterance section) is T4. Accordingly, an unnecessary waiting time may occur.

When voice activity detection is performed by applying the same parameter without considering the user's utterance characteristics, the accuracy and efficiency of voice activity detection may low.

Figure 3:
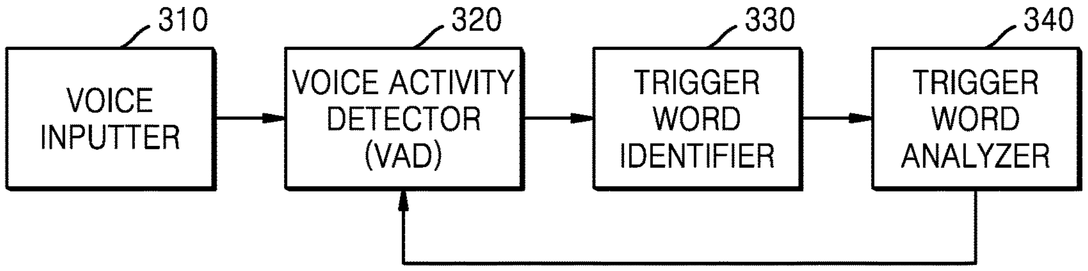
FIG. 3 is a block diagram of an electronic device according to an embodiment of the disclosure.

FIG. 3 is a block diagram of an electronic device according to an embodiment of the disclosure.

Referring to FIG. 3, the electronic device 100 according to an embodiment of the disclosure may include a voice inputter 310, a voice activity detector (VAD) 320, a trigger word identifier 330 and a trigger word analyzer 340.

The voice inputter 310 may receive audio data of a user's utterance. For example, when the electronic device 100 receives the user's utterance through the internal or external audio input module (e.g., a microphone), the electronic device 100 may receive the audio data of the user's utterance from the internal or external audio input module. Alternatively, when the user's utterance is received using an internal or external microphone of an external device, the voice inputter 310 may receive the audio data from the external device through a communication module.

The voice inputter 310 may perform pre-processing to attenuate or remove noise from the audio data.

The voice activity detector 310 may detect a start point and an end point of the user's utterance by dividing the audio data of the user's utterance into a voice section (utterance section) containing the user's voice and a non-utterance section (non-utterance section or silence section) not containing the user's voice. The voice activity detector 310 may divide the audio data into a plurality of frames and identify whether each of the plurality of frames corresponds to a voice section or a non-voice section.

The voice activity detector 310 may distinguish between a voice section and a non-voice section, based on parameters which are set in the voice activity detector 310. For example, the voice activity detector 310 may identify whether each of the plurality of frames is a voice section or a non-voice section, based on parameters such as an utterance energy threshold, a hangover time, an automatic end time, and the like. The voice activity detector 310 may identify that a frame is a voice section when an utterance energy level corresponding to the frame is greater than or equal to a threshold, and identify that the frame is a non-voice section when the utterance energy level corresponding to the frame is less than the threshold.

Alternatively, the voice activity detector 310 may determine that the utterance has ended when the non-voice section continues for the hangover time or longer. When an utterance end point is not detected, the voice activity detector 310 may determine that the utterance has ended when an automatic end time has elapsed.

In addition, the voice activity detector 310 may perform a process of removing the non-utterance section from the user's audio data.

The trigger word identifier 330 may identify whether the user's utterance corresponds to a trigger word. For example, the trigger word identifier 330 may identify whether audio data of an utterance section detected by the VAD 320 corresponds to a trigger word. The trigger word is a word indicating the start of the utterance, and may be referred to as a wakeup word, an utterance start word, or the like but is not limited thereto.

The trigger word may be set in advance, and the trigger word recognizer 330 may include an isolated word identifier that searches for a word with a maximum probability, a keyword search engine that searches for a preset keyword of the audio data.

Alternatively, the trigger word identifier 330 may perform a process of obtaining the audio data of the utterance section in the form of text or words and identify whether text or words obtained as a result of the processing corresponds to a trigger word.

The trigger word analyzer 340 may analyze the user's utterance corresponding to a trigger word to identify the user's utterance characteristics. The trigger word analyzer 340 may analyze an utterance energy level and rate of a voice section corresponding to the trigger word to identify the user's utterance characteristics. The trigger word analyzer 340 may change settings of the parameters of the VAD 320, based on the user's utterance characteristics.

For example, the trigger word analyzer 340 may compare an utterance rate (or utterance time) of a user who utters a trigger word with a reference utterance rate (or reference utterance time) to change a hangover time used for voice activity detection. In this case, the reference utterance rate is a preset value and may be an average value of utterance rates of general people.

Alternatively, an utterance energy level of a user who utters a trigger word may be compared with a reference utterance energy level to change an utterance energy threshold used for voice activity detection. In this case, the reference utterance energy level may be an average value of utterance energy levels of various people.

The trigger word analyzer 340 may calculate values Vc and Ec by using Equation 1 below.

$$V_c = \frac{t_{avg}}{t_{trigger}},\ E_c = \frac{e_{avg}}{e_{trigger}} \quad \text{[Equation 1]}$$

Here, Vc represents a ratio between a reference utterance time $t_{avg}$ (a statistically calculated average time during which a trigger word is uttered) and an utterance time $t_{trigger}$ for a user to utter the trigger word. Ec represents a ratio between a reference utterance energy level $e_{avg}$ (a statistically calculated average utterance energy level for uttering the trigger word) and an utterance energy level $e_{trigger}$ for the user to utter the trigger word.

The trigger word analyzer 340 may change parameters such as a hangover time of the VAD 320, the utterance energy threshold, and the like, based on the values Vc and Ec.

For example, the trigger word analyzer 340 may change the hangover time by using the value Vc. When the user's utterance rate is low, the value Vc decreases, and as the value Vc decreases, the hangover time may be changed to be increased. On the other hand, when the user's utterance rate is high, the value Vc increases, and as the value Vc increases, the hangover time may be changed to be reduced. This will be described in detail with reference to FIG. 4 below.

In addition, the trigger word analyzer 340 may change the utterance energy threshold by using the value Ec. When the user's utterance energy level is low, the value Ec increases, and as the value Ec increases, the utterance energy threshold may be changed to be reduced. On the other hand, when the user's utterance energy level is high, the value Ec decreases, and as the value Ec decreases, the utterance energy threshold may be changed to be increased. Accordingly, when a user with a low utterance energy level utters, a lower utterance energy threshold is reduced to prevent the user's utterance from being identified as noise, and when a user with a high utterance energy level utters, a higher utterance energy threshold is increased to prevent the user's utterance from being identified as noise.

The trigger word analyzer 340 may variably set a size of a window (e.g., a Hamming window) used to analyze a user's utterance characteristics, such as the user's utterance rate or utterance energy level, based on the user's utterance characteristics. For example, when the user's utterance rate is high, the size of the window may be reduced, and when the user's utterance rate is low, the size of the window may be increased to analyze the user's utterance characteristics.

In addition, the trigger word analyzer 340 may change settings of the parameters of the VAD 320, based on a pitch of sound uttered by a user who utters a trigger word, a signal-to-noise ratio, a zero-crossing rate Z, a result of analyzing a spectrum, and the like.

Figure 4A:
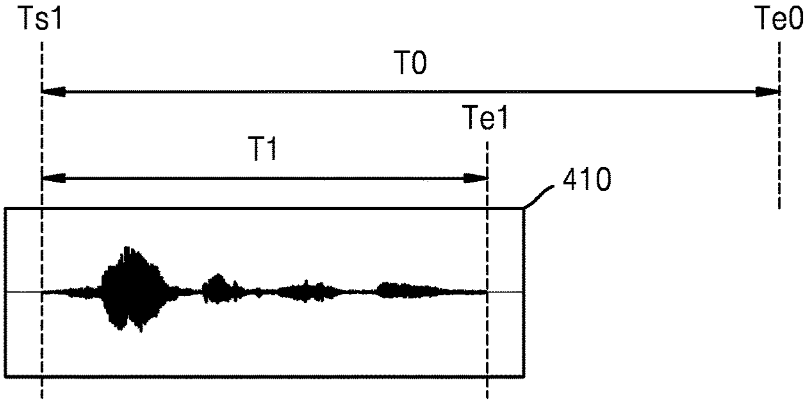
FIGS. 4A and 4B are diagrams for describing a method of analyzing audio data corresponding to a trigger word, according to an embodiment of the disclosure.
Figure 4B:
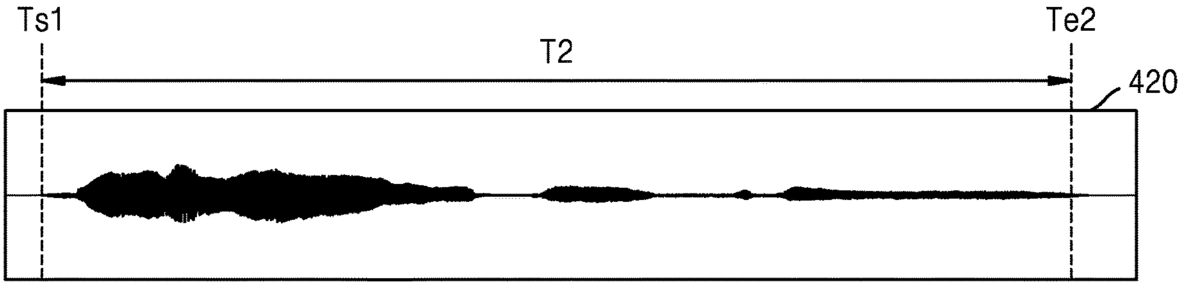

FIGS. 4A and 4B are diagrams for describing a method of analyzing audio data corresponding to a trigger word, according to an embodiment of the disclosure.

FIGS. 4A and 4B illustrate audio data corresponding to trigger words when different users utter the trigger word.

Referring to FIGS. 4A and 4B, first audio data 410 represents audio data corresponding to a trigger word when a first user utters the trigger word, and second audio data 420 represents audio data corresponding to the trigger word when a second user utters the trigger word that the first user utters.

A length of an utterance section in which a trigger word is spoken may vary according to a user, and when voice activity detection is performed using the same parameters, the accuracy and efficiency of voice activity detection may be low as described above with reference to FIGS. 2A and 2B.

In one embodiment of the disclosure, the trigger word analyzer 340 may calculate a first utterance time T1(=Te1−Ts1) by detecting an utterance start point Ts1 and an utterance end point Te1 from the first audio data 414.

The trigger word analyzer 340 may calculate a ratio Vc1 between a reference utterance time T0 during which a trigger word is spoken and a first user's first utterance time T1, and change a hangover time of the VAD 320, based on the ratio Vc1. In this case, the reference utterance time T0 may be an utterance time during which ordinary people utter the trigger word.

For example, when the hangover time of the VAD 320 is set to an average hangover time $T_h$, the hangover time may be changed to Th/Vc1.

Accordingly, when an utterance rate of the first user is higher than a reference utterance rate, the ratio Vc1 is greater than 1 and the hangover time reduces and thus a time required to determine the utterance end point Te1 may be reduced. Accordingly, an unnecessary waiting time may be reduced when a user having a high utterance rate utters.

In addition, the trigger word analyzer 340 may calculate a second utterance time T2(=Te2−Ts1) by detecting an utterance start point Ts1 and an utterance end point Te2 in the second audio data 420.

The trigger word analyzer 340 may calculate a ratio Vc2 between the reference utterance time T0 and the second user's second utterance time T2, and change the hangover time of the VAD 320, based on the ratio Vc2. For example, when the hangover time of the VAD 320 is set to an average hangover time $T_h$, the hangover time may be changed to Th/Vc2.

Accordingly, when an utterance rate of the second user is lower than the reference utterance rate, the ratio Vc2 is less than 1 and the hangover time increases and thus a time required to determine the utterance end point Te2 may be increased. Accordingly, when a user having a low utterance rate utters, a silent section between words may not be determined as an utterance end point even when the silent section is relatively long. Accordingly, when the user having the low utterance rate utters, loss of the utterance may be prevented.

Figure 5:
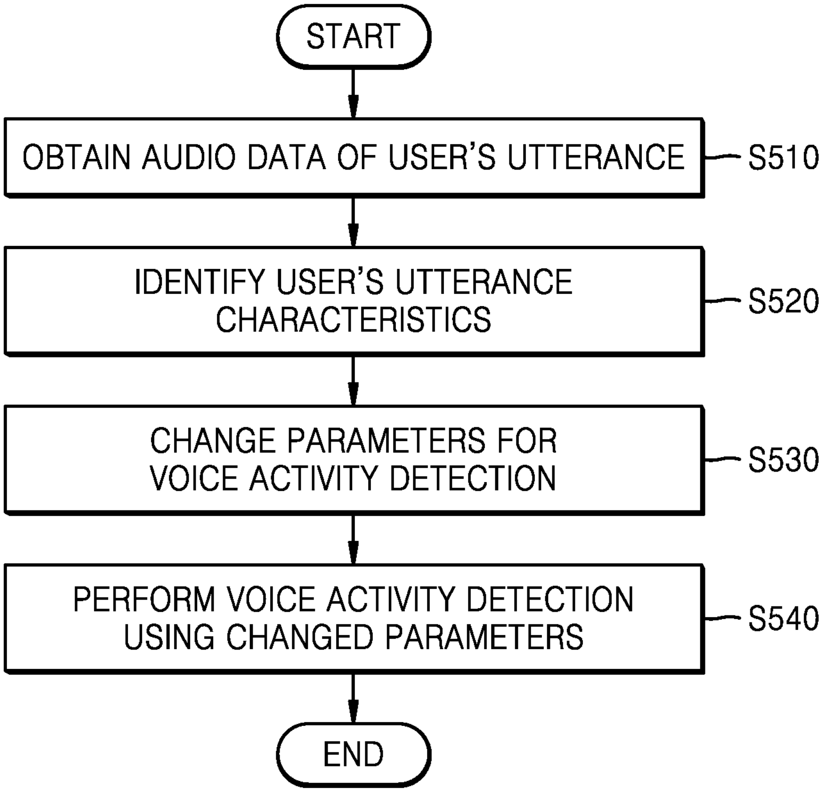
FIG. 5 is a flowchart of an operating method of an electronic device, according to an embodiment of the disclosure.

FIG. 5 is a flowchart of an operating method of an electronic device, according to an embodiment of the disclosure.

Referring to FIG. 5, the electronic device 100 according to an embodiment of the disclosure may obtain audio data of a user's utterance (S510). The electronic device 100 may obtain audio data by receiving the user's utterance through an audio input module or obtain audio data of the user's utterance from an external device through a communication module. However, embodiments of the disclosure are not limited thereto.

In addition, when a trigger word is identified or a predetermined input is received, the electronic device 100 may start voice recognition with respect to audio data.

In one embodiment of the disclosure, when voice recognition is started for the audio signal, the electronic device 100 may perform voice activity detection by analyzing the audio signal of the user's utterance.

The electronic device 100 may identify the user's utterance characteristics, based on a voice section detected from the audio data of the user's utterance (S520).

The user's utterance characteristics may include, but are not limited to, the user's utterance energy, an utterance rate, an utterance time, a pitch of the utterance, and the like.

For example, when the user utters a pre-set keyword, the electronic device 100 may analyze the user's utterance characteristics by measuring the user's utterance energy, an utterance rate, an utterance time, a pitch of uttered sound, and the like and comparing them with reference values (e.g., an average utterance energy level, an average utterance rate, an average utterance time, an average pitch of uttered sound, etc.) of the pre-set keyword.

In this case, the reference values of the pre-set keyword may be stored in advance in the electronic device 100 or obtained from an external device. The pre-set keyword according to an embodiment of the disclosure may be, but is not limited to, a trigger word, a wakeup word, an utterance start word, or the like which indicates the start of the utterance.

The electronic device 100 may change parameters for voice activity detection, based on the user's utterance characteristics (S530).

The electronic device 100 may change parameters for performing voice activity detection (e.g., an utterance energy threshold, an utterance rate threshold, an uttered-sound pitch threshold, a hangover time, an automatic end time, a size of a window for utterance analysis, etc.), based on the user's utterance energy level, utterance rate, utterance time, and uttered-sound pitch.

The electronic device 100 may perform voice activity detection with respect to audio data of the user's utterance by using the changed parameters (S540).

Figure 6:
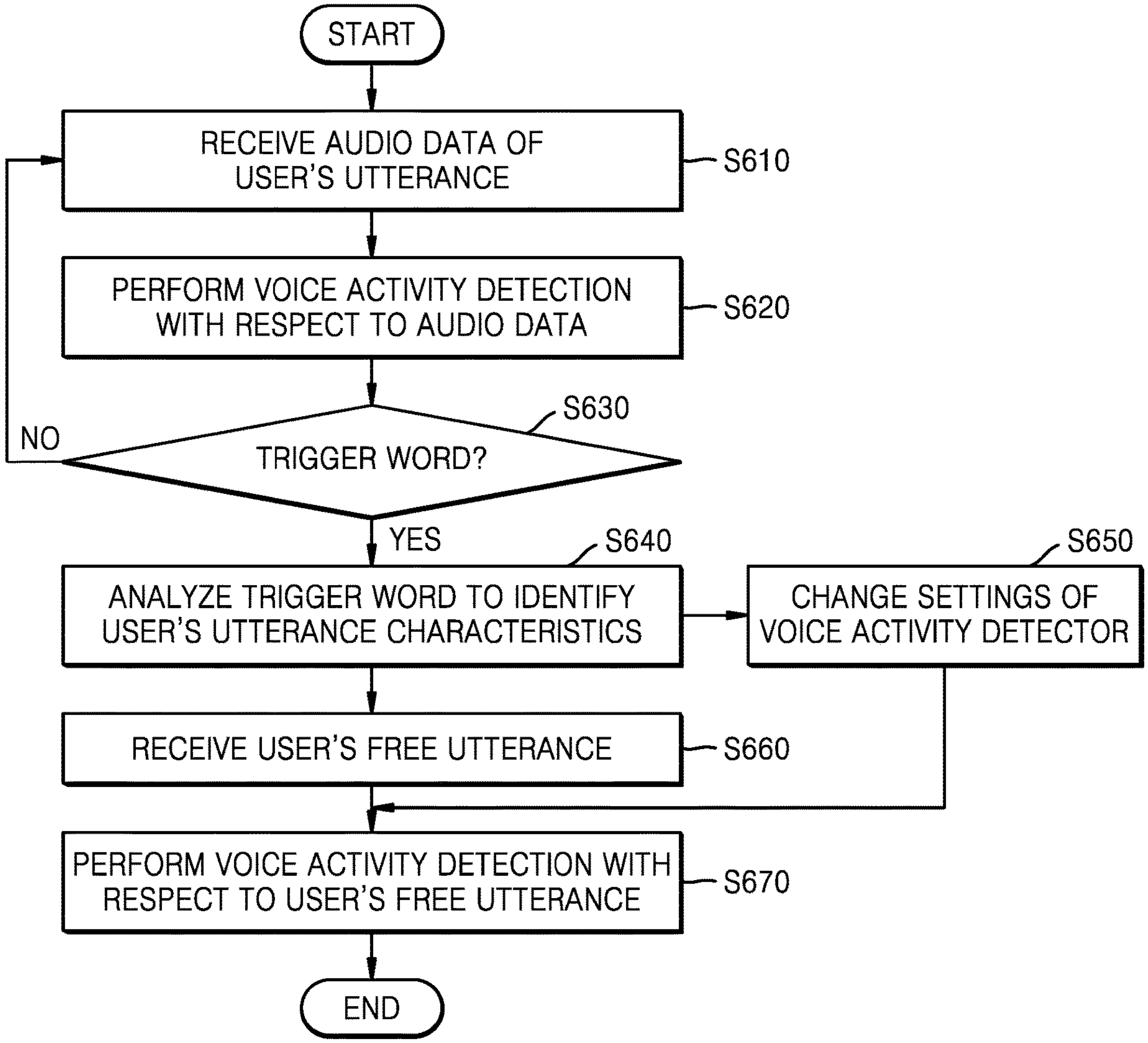
FIG. 6 is a flowchart of an operating method of an electronic device, according to another embodiment of the disclosure.

FIG. 6 is a flowchart of an operating method of an electronic device, according to another embodiment of the disclosure.

Referring to FIG. 5, the electronic device 100 according to an embodiment of the disclosure may receive audio data of a user's utterance (S610).

For example, when the electronic device 100 receives the user's utterance through an internal or external audio input module (e.g., a microphone), the electronic device 100 may receive the audio data of the user's utterance from the internal or external audio input module. Alternatively, when the user's utterance is received using an internal or external microphone of an external device, the electronic device 100 may receive the audio data from the external device through a communication module (communicator).

The electronic device 100 may perform voice activity detection with respect to the audio data (S620).

The electronic device 100 may distinguish between a voice section (utterance section) and a non-voice section (non-utterance section) from the audio data, based on pre-set parameters. For example, the electronic device 100 may identify whether each of a plurality of frames included in the audio data corresponds to a voice section or a non-voice section, based on parameters such as an utterance energy threshold, a hangover time, an automatic end time, and the like. The electronic device 100 may identify that a frame is a voice section when an utterance energy level corresponding to the frame is greater than or equal to a threshold, and may identify that the frame is a non-voice section when the utterance energy level corresponding to the frame is less than the threshold.

Alternatively, the electronic device 100 may determine that the utterance has ended when the non-voice section continues for a set hangover time or longer. When an utterance end point is not detected, the electronic device 100 may determine that the utterance has ended when an automatic end time has elapsed.

The electronic device 100 may identify whether audio data of an utterance section identified as a voice section corresponds to a trigger word (S630). The trigger word is a word indicating the start of the utterance, and may be referred to as a wakeup word, an utterance start word, or the like but is not limited thereto.

When the audio data is identified as the trigger word, the electronic device 100 may analyze the user's utterance corresponding to the trigger word to identify the user's utterance characteristics (S640). For example, the electronic device 100 may analyze the user's utterance characteristics by comparing an utterance energy level, utterance rate, utterance time, pitch of uttered sound, etc. of the user who utters the trigger word with reference values of the trigger word (e.g., an average utterance energy level, an average utterance rate, an average utterance time, an average pitch of uttered sound, etc. when general people utter the trigger word).

The electronic device 100 may change settings of a voice activity detector, based on the user's utterance characteristics (S650). For example, the electronic device 100 may change parameters for performing voice activity detection (e.g., an utterance energy threshold, an utterance rate threshold, an uttered-sound pitch threshold, a hangover time, an automatic end time, a size of a window for utterance analysis, etc.), based on the user's utterance energy level, utterance rate, utterance time, and uttered-sound pitch.

When the user's free utterance is input after the trigger word is received (S660), the electronic device 100 may perform voice activity detection with respect to the user's free utterance by using the changed parameters (S670).

Figures 7, 8:
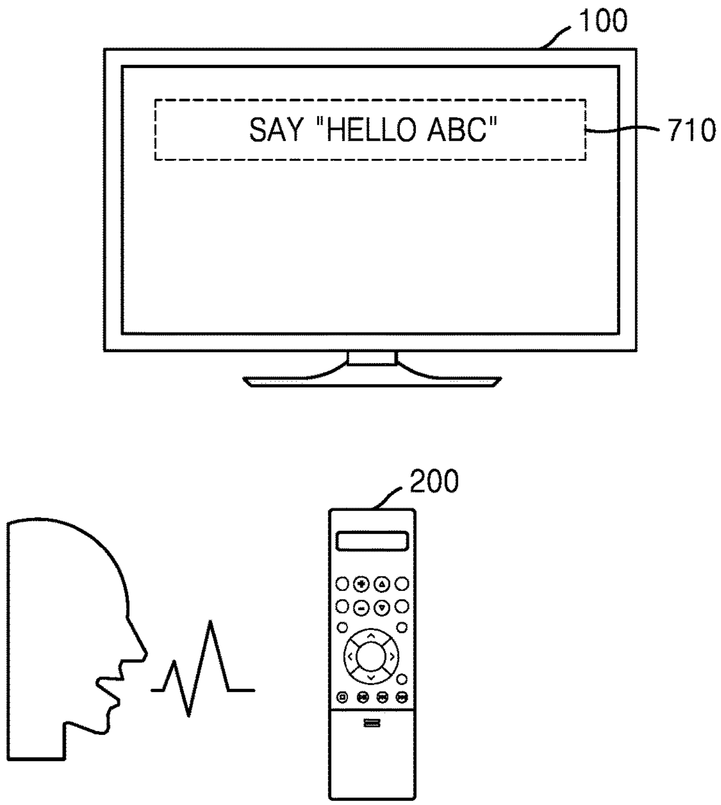
FIG. 7 is a diagram for describing a method of changing a parameter for performing voice activity detection, based on a user's utterance characteristics, the method being performed by an electronic device, according to an embodiment of the disclosure.
FIG. 8 is a diagram for describing a method of changing a parameter for performing voice activity detection, by using a database including user information, the method being performed by an electronic device, according to an embodiment of the disclosure.

FIG. 7 is a diagram for describing a method of changing a parameter for performing voice activity detection, based on a user's utterance characteristics, the method being performed by an electronic device, according to an embodiment of the disclosure.

Referring to FIG. 7, the electronic device 100 according to an embodiment of the disclosure may receive a certain keyword to determine a user's utterance characteristics.

For example, when a user utters a trigger word or performs a predetermined input, the electronic device 100 displays on the display thereof a message 710 instructing to utter the keyword (e.g., "Hello ABC"). The predetermined input may be an input for pressing a physical button included in the electronic device 100 or the control device 200 controlling the electronic device 100 or may be an input for selecting a graphic interface (e.g., an icon) displayed on the display of the electronic device 100 or a display of the control device 200.

The keyword is a keyword preset in the electronic device 100 and is a combination of simple words rather than a long sentence. Alternatively, the electronic device 100 may store reference utterance characteristics (e.g., an utterance energy level, an utterance rate, an utterance time, a pitch of uttered sound, etc.) corresponding to the keyword. In this case, the reference utterance characteristics corresponding to the keyword may refer to an average utterance energy, an average utterance rate, an average utterance time, an average pitch of uttered sound, etc. when general people utter the keyword.

The user may utter the keyword (e.g., "Hello ABC") in response to the displayed message. The user may utter to the electronic device 100 or the control device 200. When the user utters to the electronic device 100, the electronic device 100 may receive audio data of the user's utterance through the audio input module. When the user utters to the control device 200, the electronic device 100 may receive audio data of the user's utterance through the communication module.

The electronic device 100 may detect a voice section by performing voice activity detection with respect to the received audio data and identify whether the keyword is included in the voice section to obtain the user's utterance characteristics for the keyword. For example, the electronic device 100 may obtain utterance characteristics (e.g., an utterance energy level, an utterance rate, an utterance time, a pitch of uttered sound, etc.) of the user who utters the keyword.

The electronic device 100 may compare the obtained user's utterance characteristics with reference utterance characteristics to change parameters for performing voice activity detection (e.g., an utterance energy threshold, an utterance rate threshold, an uttered-sound pitch threshold, a hangover time, an automatic end time, a size of a window for utterance analysis, etc.).

The electronic device 100 may perform voice activity detection using the changed parameters while the user utters. For example, the electronic device 100 may perform voice activity detection using the changed parameter with respect to the user's free utterance which is input after the keyword is uttered. However, embodiments of the disclosure are not limited thereto.

FIG. 8 is a diagram for describing a method of changing parameters for performing voice activity detection, by using a database including user information, the method being performed by an electronic device, according to an embodiment of the disclosure.

Referring to FIG. 8, the electronic device 100 according to an embodiment of the disclosure may include a database 800 storing user information. The database 800 according to an embodiment of the disclosure may include at least one of user face information, user fingerprint information, voice activity detection parameters, or trigger word utterance characteristics (e.g., a trigger word utterance energy level, a trigger word utterance rate, etc.) corresponding to user identification information.

For example, when a first user logs in with his or her account information and utters a trigger word, the electronic device 100 may store the first user's trigger word utterance energy level and trigger word utterance rate as first user information in the database 800.

Alternatively, the electronic device 100 may obtain the first user's face information by photographing the first user while the first user utters the trigger word, and store the obtained face information of the first user as first user information in the database 800.

Alternatively, the electronic device 100 may receive the first user's fingerprint information through an external device or the like while the first user utters the trigger word, and store the received first user's fingerprint information as first user information in the database 800.

Alternatively, the electronic device 100 may determine a first voice activity detection parameter, based on the first user's trigger word utterance energy level and trigger word utterance rate, and store the determined first voice activity detection parameter as first user information in the database 800.

The electronic device 100 may also store in the database 800 user information of a second user to a fourth user in the same manner.

When the first user utters, the electronic device 100 may identify the first user by photographing the first user to perform face recognition or receiving an image of the first user's fingerprint to perform fingerprint recognition. In this case, even when the first user does not utter the trigger word, the parameters for performing voice activity detection may be changed, based on the first user's trigger word utterance energy level and trigger word utterance rate and the first voice activity detection parameter which are included in the first user information.

In addition, the electronic device 100 may store, in the database 800, not only the utterance characteristics with respect to the trigger word but also utterance characteristics of the first user's previous utterance input, and change the parameters for performing voice activity detection, based on the utterance characteristics of the first user's previous utterance input.

Figure 9:
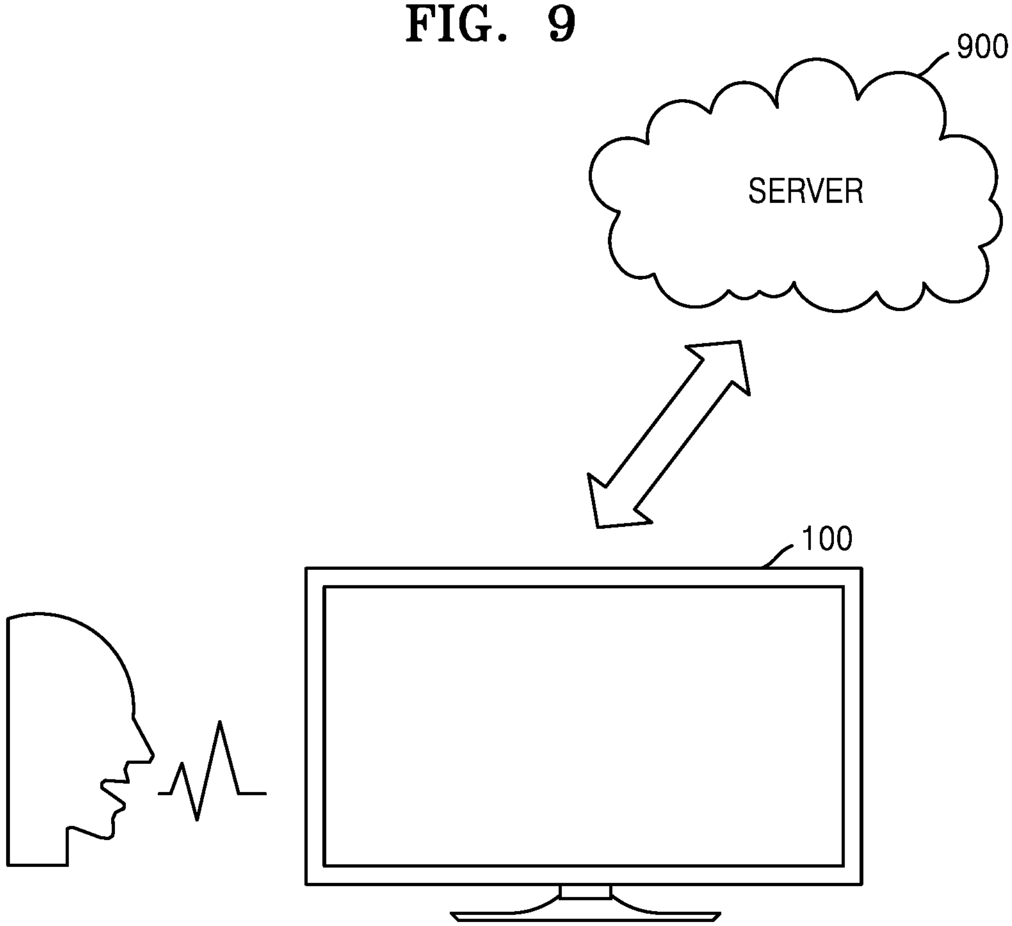
FIG. 9 is a diagram illustrating a voice recognition system according to an embodiment of the disclosure.

FIG. 9 is a diagram illustrating a voice recognition system according to an embodiment of the disclosure.

Referring to FIG. 9, the voice recognition system according to an embodiment of the disclosure may include an electronic device 100 and a server 900. The server 900 may be connected to the electronic device 100 through a network or short-range communication. In one embodiment of the disclosure, the server 900 may be a server that performs voice recognition.

In one embodiment of the disclosure, the electronic device 100 may receive audio data of a user's utterance. For example, the electronic device 100 may convert the user's utterance (analog signal) into an audio signal (digital signal) which is an electrical signal through an internal or external audio input module (e.g., a microphone), and transmit the audio signal to a processor.

Alternatively, when the user utters to the control device 200 according to an embodiment of the disclosure, the control device 200 may convert the user's utterance (analog signal) into an audio signal (digital signal) which is an electrical signal through an internal or external microphone. The control device 200 may transmit the audio signal to the electronic device 100 through a communication module such as a Bluetooth (BT) module.

The electronic device 100 may detect a voice section by performing voice activity detection with respect to the audio signal (audio data), and transmit the detected voice section to the server 900.

In one embodiment of the disclosure, the server 900 may perform voice recognition on the voice section received from the electronic device 100. The voice recognition may be a process of obtaining text data corresponding to the audio signal. The voice recognition may include a speech-to-text (STT) process. For example, the voice recognition may include a process of identifying a voice signal uttered by the user as a character string. Text obtained as a result of voice recognition may be in the form of a sentence, word or phrase in natural language. However, embodiments of the disclosure are not limited thereto.

The server 900 may identify whether a trigger word is included in the voice section through voice recognition.

When the trigger word is included in the voice section, the server 900 may analyze the user's utterance corresponding to the trigger word to identify the user's utterance characteristics. For example, the server 900 may analyze the user's utterance characteristics by comparing an utterance energy level, an utterance rate, an utterance time, pitch of uttered sound, etc. of the user who utters the trigger word with reference values of the trigger word (e.g., an average utterance energy level, an average utterance rate, an average utterance time, an average pitch of uttered sound, etc. when general people utter the trigger word).

The server 900 may transmit a result of analyzing the utterance characteristics to the electronic device 100.

Alternatively, when the server 900 identifies whether the trigger word is included in the voice section and informs the electronic device 100 of a result of the identification, the electronic device 100 may analyze the user's utterance corresponding to the trigger word to identify the user's utterance characteristics. A method, performed by the electronic device 100, of identifying a user's utterance characteristics by analyzing the user's utterance corresponding to a trigger word has been described above in detail with reference to FIGS. 3 to 8 and thus a detailed description thereof is omitted here.

The electronic device 100 may change parameters for performing voice activity detection, based on the user's utterance characteristics, and when the user's free utterance is input after a trigger word is input, voice activity detection may be performed on the user's free utterance by using the changed parameters.

The electronic device 100 may transmit a voice section detected from the user's free utterance to the server 900, and the server 900 may perform voice recognition on the user's free utterance and perform a certain function based on a result of the voice recognition. Alternatively, the result of the voice recognition may be transmitted to the electronic device 100 or another server (not shown).

When the electronic device 100 receives the result of the voice recognition, the electronic device 100 may perform a certain function corresponding to the result of the voice recognition. Alternatively, when another server receives the result of the voice recognition, the other server may perform a certain function based on the result of the voice recognition or control another electronic device to perform the function.

Alternatively, the electronic device 100 may perform voice recognition on the voice section detected from the free utterance and perform a certain function based on the result of the voice recognition.

Figure 10:
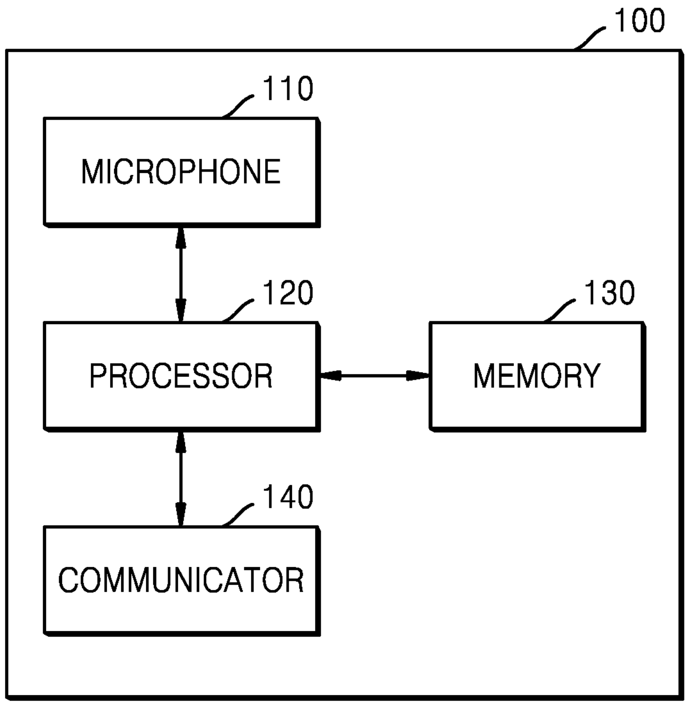
FIG. 10 is a block diagram of an electronic device according to an embodiment of the disclosure.

FIG. 10 is a block diagram of an electronic device according to an embodiment of the disclosure.

Referring to FIG. 10, an electronic device 100 according to an embodiment of the disclosure may include a microphone 110, a processor 120, a memory 130, and a communicator 140.

The microphone 110 according to an embodiment of the disclosure may receive a sound signal from an external device or a speaker (a user of the electronic device 100). In one embodiment of the disclosure, the microphone 110 may receive a voice of a user's utterance. The microphone 110 may receive an external sound signal and convert the external sound signal into an electrical signal (audio data). The microphone 110 may use various noise removal algorithms to remove noise generated during the receiving of the external sound signal.

In one embodiment of the disclosure, the communicator 120 may transmit data or signals to or receive data or signals from an external device (e.g., a control device, a server, or the like) under control of the processor 120. The communicator 140 may transmit and receive data or signals according to at least one method of a wireless LAN (e.g., Wi-Fi), Bluetooth, wired Ethernet, infrared (IR), Bluetooth Low Energy (BLE), ultrasound, or ZigBee to correspond to the performance and structure of the electronic device 100. Here, the communicator 140 may include at least one communication module capable of transmitting and receiving data according to a communication standard corresponding to the wireless LAN (e.g., Wi-Fi), Bluetooth, wired Ethernet, IR, BLE, ultrasound and ZigBee.

In one embodiment of the disclosure, the communicator 140 may transmit data or signals to and receive data or signals from a control device or server by using the same communication module (e.g., a W-Fi module). Alternatively, in one embodiment of the disclosure, a module (e.g., a Bluetooth module or an IR module) for communicating with a control device and a module (e.g., an Ethernet module or a Wi-Fi module) for communicating with a server may be different from each other.

In one embodiment of the disclosure, the processor 120 may control overall operations of the electronic device 100. In addition, the processor 120 may control other components included in the electronic device 100 to perform a certain operation.

In one embodiment of the disclosure, the processor 120 may execute one or more programs stored in the memory 130. The processor 120 may include a single core, dual cores, triple cores, quad cores, and multiples thereof. The processor 120 may include a plurality of processors.

In one embodiment of the disclosure, the memory 130 may store various data, programs, or applications for driving and controlling the electronic device 100. In addition, in one embodiment of the disclosure, the memory 130 may store user information as illustrated in and described above with reference to FIG. 8. For example, the memory 130 may store, as user information, at least one of user face information, user fingerprint information, voice activity detection parameters, or trigger word utterance characteristics corresponding to user identification information.

A program stored in the memory 130 may include one or more instructions. The program (one or more instructions) or an application stored in the memory 130 may be executed by the processor 120.

In one embodiment of the disclosure, the processor 120 may obtain audio data of a user's utterance and perform voice activity detection with respect to the obtained audio data. The processor 120 may perform voice activity detection to detect a voice section (utterance section) in the audio data and identify the user's utterance characteristics, based on the detected voice section. For example, the processor 120 may identify whether the detected voice section corresponds to a preset keyword or trigger word. The processor 120 may analyze the user's utterance corresponding to the preset keyword or trigger word to identify the user's utterance characteristics.

The processor 120 may change parameters for performing voice activity detection, based on the user's utterance characteristics (e.g., an utterance energy level, an utterance rate, an utterance time, a pitch of uttered sound, etc.). For example, the processor 120 may change an utterance energy threshold, an utterance rate threshold, an uttered-sound pitch threshold, a hangover time, an automatic end time, a size of a window for analyzing an utterance and the like, based on the user's utterance characteristics.

In addition, the processor 120 may identify the user who is uttering, and identify the user's utterance characteristics or change the parameters for performing voice activity detection by using user information corresponding to the identified user.

The processor 120 may perform voice activity detection with respect to the user's utterance by using the changed parameters.

Figure 11:
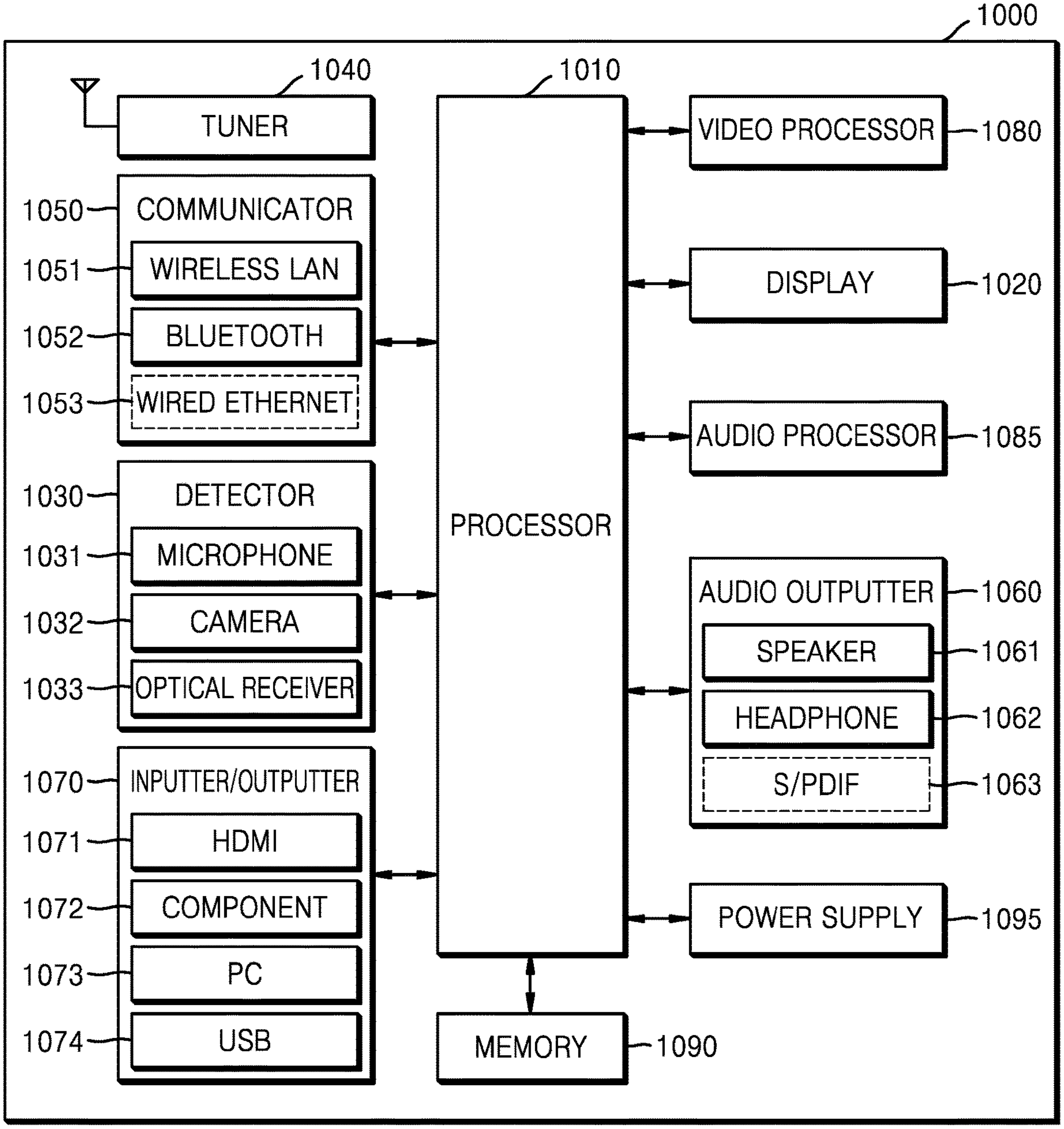
FIG. 11 is a block diagram of an electronic device according to another embodiment of the disclosure.

FIG. 11 is a block diagram of an electronic device 1000 according to another embodiment of the disclosure.

The electronic device 1000 of FIG. 11 may correspond to the electronic device 100 according to an embodiment of the disclosure as described above with reference to FIGS. 1 to 10.

Referring to FIG. 11, the electronic device 1000 according to an embodiment of the disclosure includes a tuner 1040, a processor 1010, a display 1020, a communicator 1050, a detector 1030, an inputter/outputter 1070, a video processor 1080, an audio processor 1085, an audio outputter 1060, a memory 1090, and a power supply 1095.

A microphone 1031 of FIG. 11 corresponds to the microphone 110 of FIG. 10, the communicator 1050 of FIG. 11 corresponds to the communicator 140 of FIG. 10, the processor 1010 of FIG. 11 corresponds to the processor 120 of FIG. 10, and the memory 1090 of FIG. 11 corresponds to the memory 130 of FIG. 10, and thus a detailed description thereof is omitted here.

In one embodiment of the disclosure, the tuner 1040 may tune and select only a frequency of a channel to be received by the electronic device 1000 from among various radio wave components by performing amplification, mixing, or resonance on a broadcast signal received via wire or wirelessly. The broadcast signal includes audio data, a video and additional information (e.g., an electronic program guide (EPG)).

The tuner 1040 may receive the broadcast signal from various sources such as terrestrial broadcasting, cable broadcasting, satellite broadcasting, Internet broadcasting, and the like. The tuner 1040 may receive the broadcast signal from a source such as analog broadcasting or digital broadcasting.

In one embodiment of the disclosure, the communicator 1050 may transmit data or signals to and receive data or signals from an external device or a server under control of the processor 1010. The processor 1010 may transmit content to or receive content from an external device (not shown) connected thereto through the communicator 1050, download an application from the external device, or perform web browsing.

In addition, the communicator 1050 may include a combination including one or more among a wireless LAN module 1051, a Bluetooth module 1052, and a wired Ethernet module 1053.

The video processor 1080 processes video data received by the electronic device 1000. The video processor 1080 may perform various image processing operations, such as decoding, scaling, noise filtering, frame rate conversion, resolution conversion, and the like, on the video data.

The detector 1030 may detect a user's voice, an image of the user or the user's interaction, and include the microphone 1031, a camera 1032, and an optical receiver 1033.

The microphone 1031 receives the user's uttered voice. The microphone 1031 may convert received voice into an electric signal and output the electric signal to the processor 1010. The user's voice may include, for example, voice corresponding to a menu or function of the electronic device 1000.

The camera 1032 may receive an image (e.g., continuous frames) corresponding to a user's motion, including a gesture, within a camera recognition range. The controller 1010 may select a menu displayed on the electronic device 1000 by using a received result of recognition of a motion or may perform control corresponding to the result of recognition of the motion.

An optical receiver 1033 receives an optical signal (including a control signal) from an external control device through an optical window (not shown) of a bezel of the display 1020 or the like. The optical receiver 1033 may receive an optical signal corresponding to a user input (e.g., touching, pressing, a touch gesture, voice, or a motion) from a control device (not shown). The control signal may be extracted from the received optical signal under control of the processor 1010.

The inputter/outputter 1070 receives a video (e.g., a moving picture), an audio signal (e.g., voice or music), additional information (e.g., an EPG) and the like from the outside of the electronic device 1000, under control of the processor 1010. Alternatively, the input/output unit 1070 transmits video, an audio signal, additional information, and the like to an external device under the control of the processor 1010. The inputter/outputter 1070 may include one of a high-definition multimedia interface (HDMI) port 1071, a component jack 1072, a PC port 1073, and a USB port 1074. The inputter/outputter 1070 may include a combination of the HDMI port 1071, the component jack 1072, the PC port 1073, and the USB port 1074. In addition, the inputter/outputter 1070 may include a display port (DP), a thunderbolt port, and the like.

The processor 1010 controls overall operations of the electronic device 1000 and signal flow between internal components of the electronic device 1000, and performs a data processing function. The processor 1010 may execute an operation system (OS) and various applications stored in the memory 1090 when there is a user input or a preset and stored condition is satisfied.

The processor 130 may include random access memory (RAM) to be used to store a signal or data which is input from the outside of the electronic device 1000 or used as a storage region corresponding to various operations performed by the electronic device 1000, and read-only memory (ROM) to store a control program for control of the electronic device 1000.

The processor 1010 may include a graphics processor (not shown). The graphics processor generates a screen including various objects, such as an icon, an image, and text, using an operation unit (not shown) and a renderer (not shown). The operation unit calculates attribute values, such as coordinates, a shape, a size, and color, of each object to be displayed according to a layout of the screen by using a user input detected by the detector 1030. The renderer generates screens of various layouts including objects, based on the attribute values calculated by the operation unit. A screen generated by the renderer is displayed on a display region of the display 1020.

The display 1020 generates a driving signal by converting an image signal, a data signal, an on-screen display (OSD) signal, a control signal or the like processed by the processor 130. The display 1020 may be embodied as a plasma display panel (PDP), a liquid crystal panel (LCD), an organic light-emitting diode (OLED) display, a flexible display, or the like or may be embodied as a three-dimensional (3D) display. Alternatively, the display 1020 may be configured as a touch screen to be used as an input device, in addition to an output device.

The audio processor 1085 processes audio data. The audio processor 1085 may perform various operations, such as decoding, amplification, and noise filtering, on the audio data. The audio processor 1085 may include a plurality of audio processing modules to process audio data corresponding to a plurality of pieces of content.

The audio outputter 1060 outputs audio data included in a broadcast signal received through the tuner 1040 under control of the processor 1010. The audio outputter 1060 may output audio data (e.g., voice or sound) input via the communicator 1050 or the inputter/outputter 1070. The audio outputter 1060 may output audio data stored in the memory 1090 under control of the processor 1010. The audio outputter 1060 may include at least one of a speaker 1061, a headphone output terminal 1062, or a Sony/Philips Digital Interface (S/PDIF) output terminal 1063. The audio outputter 1060 may include a combination of the speaker 1061, the headphone output terminal 1062 and the S/PDIF output terminal 1063.

The power supply 1095 supplies power from an external power source to the internal components of the electronic device 1000 under control of the processor 1010. Alternatively, the power supply 1095 supplies power output from one or more batteries (not shown) included in the electronic device 1000 to the internal components under control of the processor 1010.

The memory 1090 may store various data, programs, or applications for driving and controlling the electronic device 1000 under control of the processor 1010. Although not shown, the memory 1090 may include a broadcast receiving module, a channel control module, a volume control module, a communication control module, a voice recognition module, a motion recognition module, an optical receiving module, a display control module, an audio control module, an external input control module, a power control module, a power control module of an external device connected wirelessly (e.g., Bluetooth), a voice database (DB), or a motion database (DB). The modules and databases (not shown) of the memory 1090 may be embodied as software to perform by the electronic device 1000 a broadcast reception control function, a channel control function, a volume control function, a communication control function, a voice recognition function, a motion recognition function, and an optical reception control function, a display control function, an audio control function, an external input control function, a power control function, or a power control function of an external device connected wirelessly (e.g., Bluetooth). The processor 1010 may perform each of these functions by using the software stored in the memory 1090.

The block diagrams of the electronic devices 100 and 1000 illustrated in FIGS. 10 and 11 are only block diagrams according to embodiments of the disclosure. Some components of each of the block diagrams may be combined together or omitted or new components may be added thereto according to the specifications of the electronic devices 100 and 1000 that are actually implemented. That is, two or more components may be combined into one component or one component may be divided into two or more components as needed. A function performed in each block is only provided to explain embodiments of the disclosure and the scope of the disclosure should not be construed as being limited to specific operations or devices.

An operating method of an electronic device, according to an embodiment of the disclosure, may be embodied in the form of program commands executable through various computer means and recorded on a computer-readable recording medium. The computer-readable recording medium may include program commands, data files, data structures, and the like solely or in combination. The program commands recorded on this medium may be specially designed and configured for the disclosure or may be well-known and available to those of ordinary skill in the field of computer software. Examples of the computer-readable recording medium include magnetic media such as hard disks, floppy disks, and magnetic tapes, optical media such as CD-ROMs and DVDs, magneto-optical media such as floptical disks, and hardware devices, such as ROMs, RAMs, and flash memory, which are specifically configured to store and execute program commands. Examples of the program commands include not only machine code generated by a compiler but also high-level language code executable by a computer using an interpreter or the like.

Operating methods of an electronic device according to the embodiments of the disclosure set forth herein may be provided by being included in a computer program product. A computer program product may be traded as a product between a seller and a purchaser.

The computer program product may include a software program and a computer-readable storage medium on which the software program is stored. For example, the computer program product may include a product (e.g., a downloadable application) in the form of a software program electronically distributed through a manufacturer of a broadcast receiving device or an electronic market (e.g., Google Play Store or App Store). For electronic distribution, at least a part of the software program may be stored in a storage medium or temporarily generated. In this case, the storage medium may be a server of a manufacturer, a server of an electronic market, or a storage medium of a relay server temporarily storing the software program.

The computer program product may include a storage medium of a server or a storage medium of a client device in a system that includes the server and the client device. Alternatively, when there is a third device (e.g., a smart phone) communicatively connected to the server or the client device, the computer program product may include a storage medium of the third device. Alternatively, the computer program product may include the software program transmitted from the server to the client device or the third device or transmitted from the third device to the client device.

In this case, one of the server, the client device, and the third device may execute the computer program product to perform the methods according to the embodiments of the disclosure set forth herein. Alternatively, two or more of the server, the client device, and the third device may execute the computer program product to distributively perform the methods according to the embodiments of the disclosure set forth herein.

For example, the server (e.g., a cloud server or an artificial intelligence server) may execute the computer program product stored therein to control the client device communicatively connected to the server to perform the methods according to the embodiments of the disclosure set forth herein.

In one embodiment of the disclosure, an electronic device may perform voice activity detection by applying different parameters according to a user's utterance characteristics, thereby improving the accuracy and efficiency of voice activity detection.

It is possible to prevent loss of utterance of a user having a low utterance rate and reduce an unnecessary waiting time of a user having a high utterance rate.

A user's utterance characteristics can be easily analyzed using utterance of a trigger word.

While embodiments of the disclosure have been described above in detail above, the scope of the disclosure is not limited thereto, and it should be understood that various modifications and improvements made by those of ordinary skill in the art using the basic concepts of the disclosure defined in the following claims are included within the scope of the disclosure.

What is claimed is:

1. An electronic device comprising:

a memory storing one or more instructions; and a processor configured to execute the one or more instructions stored in the memory:

to receive audio data corresponding to a user utterance, the audio data including an utterance section comprising a trigger word that indicates a start of the utterance;

to identify whether the user utterance corresponds to the trigger word;

to analyze the identified user utterance corresponding to the trigger word to identify user utterance characteristics comprising at least one of an utterance rate, utterance energy level, and pitch of uttered sound;

to change a parameter for performing a function corresponding to voice detection by using the identified user utterance characteristics; and to perform the function corresponding to voice detection for user utterance input after the trigger word is received by using the changed parameter.

2. The electronic device of claim 1, wherein the processor is further configured to execute the one or more instructions stored in the memory to compare the identified user utterance characteristics with reference utterance characteristics with respect to the trigger word, and change the parameter based on a result of the comparison.

3. The electronic device of claim 1, wherein the processor is further configured to execute the one or more instructions stored in the memory to detect a start point of the user utterance on the received audio data and an end point of the user utterance in the received audio data while the user is uttering to distinguish between the utterance section of the received audio data and a non-utterance section of the received audio data.

4. The electronic device of claim 1, wherein the parameter for performing the function corresponding to voice detection comprises at least one of an energy threshold for identifying, in the received audio data, the utterance section, a hangover time, or automatic end time while the user is uttering.

5. The electronic device of claim 1, further comprising a communicator configured to receive the audio data corresponding to the user utterance.

6. The electronic device of claim 1, further comprising a microphone configured to receives the user utterance and to convert the received user utterance through the microphone into the audio data.

7. An operating method of an electronic device, the operating method comprising:

receiving audio data corresponding to a user utterance, the audio data comprising an utterance section comprising a trigger word that indicates a start of the utterance;

identifying whether the user utterance corresponds to the trigger word;

analyzing the identified user utterance corresponding to the trigger word to identify user utterance characteristics comprising at least one of an utterance rate, utterance energy level, and pitch of uttered sound;

changing a parameter for performing a function corresponding to voice detection by using the identified user utterance characteristics; and performing the function corresponding to voice detection for the user utterance input after the trigger word is received by using the changed parameter.

8. The operating method of claim 7, wherein the identifying of the parameter for performing the function corresponding to voice detection comprises comparing the identified user utterance characteristics with reference voice characteristics with respect to the trigger word and changing the parameter based on a result of the comparison.

9. The operating method of claim 7, wherein the performing of the function corresponding to voice detection for the user utterance comprises detecting a start point of the user utterance and an end point of the user utterance while the user is uttering to distinguish between the utterance section of the received audio data and a non-utterance section of the received audio data.

10. The operating method of claim 7, wherein the parameter for performing the function corresponding to voice detection comprises at least one of an energy threshold for identifying the utterance section, a hangover time, and an automatic end time while the user is uttering.

11. The operating method of claim 7, wherein the receiving of the audio data of the user utterance comprises receiving the audio data corresponding to the user utterance through a communicator.

12. The operating method of claim 7, wherein the receiving of the audio data of the user utterance comprises receiving the user utterance through a microphone and converting the received user utterance through the microphone into the audio data.

13. A non-transitory computer-readable recording media having recorded thereon a program for executing in a computer the operating method of claim 7.

* * * * *